(12) United States Patent
Brown et al.

(10) Patent No.: US 7,840,799 B2
(45) Date of Patent: *Nov. 23, 2010

(54) TRANSMISSION OF SECURE ELECTRONIC MAIL FORMATS

(75) Inventors: Michael K. Brown, Kitchener (CA);
Michael S. Brown, Waterloo (CA);
Michael G. Kirkup, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/404,750

(22) Filed: Mar. 16, 2009

(65) Prior Publication Data

US 2009/0177880 A1    Jul. 9, 2009

Related U.S. Application Data

(63) Continuation of application No. 10/836,807, filed on Apr. 30, 2004, now Pat. No. 7,506,154.

(51) Int. Cl.
*H04L 9/00* (2006.01)
*G06F 9/00* (2006.01)

(52) U.S. Cl. .................. 713/152; 713/176; 726/12; 726/14

(58) Field of Classification Search .................. 713/152
See application file for complete search history.

(56) References Cited

U.S. PATENT DOCUMENTS

| 6,272,086 | B1 | 8/2001 | Jaquette et al. | |
|---|---|---|---|---|
| 6,289,105 | B1 * | 9/2001 | Murota | 380/286 |
| 6,584,564 | B2 * | 6/2003 | Olkin et al. | 713/152 |
| 7,127,741 | B2 * | 10/2006 | Bandini et al. | 726/14 |
| 7,162,738 | B2 * | 1/2007 | Dickinson, III et al. | 726/14 |
| 7,506,154 | B2 * | 3/2009 | Brown et al. | 713/152 |
| 2002/0004899 | A1 * | 1/2002 | Azuma | 713/152 |
| 2004/0019780 | A1 * | 1/2004 | Waugh et al. | 713/152 |
| 2004/0190411 | A1 | 9/2004 | Ko et al. | |
| 2004/0233566 | A1 | 11/2004 | Jaquette | |
| 2005/0004876 | A1 | 1/2005 | Movalli et al. | |
| 2005/0160292 | A1 * | 7/2005 | Batthish et al. | 713/201 |
| 2005/0231846 | A1 | 10/2005 | Winarski et al. | |
| 2005/0235095 | A1 | 10/2005 | Winarski et al. | |

FOREIGN PATENT DOCUMENTS

JP    2003-198632    7/2003

(Continued)

OTHER PUBLICATIONS

B.Ramsdell, Editor, Worldtalk, "RFC 2633: S/MIME Version 3 Message Specification," Jun. 1999, pp. 1-30.*

(Continued)

*Primary Examiner*—Kaveh Abrishamkar
(74) *Attorney, Agent, or Firm*—Jenna L. Wilson; Dimock Stratton LLP

(57) ABSTRACT

A method and system for providing e-mail messages to a receiving e-mail application. The e-mail messages as sent from a sending e-mail application being secure and in opaque signed format. The opaque signed e-mail messages being converted to clear signed e-mail messages by decoding extracting message content and digital signatures. The clear signed e-mails being sent to a receiving e-mail application.

25 Claims, 3 Drawing Sheets

FOREIGN PATENT DOCUMENTS

| | | |
|---|---|---|
| KR | 10-2002-0067372 A | 8/2000 |
| TW | 508929 | 11/2002 |
| TW | 536881 | 6/2003 |
| TW | 567702 | 12/2003 |
| TW | 200401204 A | 5/2009 |
| WO | 00/31944 A1 | 6/2000 |
| WO | 03/001326 A2 | 1/2003 |

OTHER PUBLICATIONS

B.Ramsdell, Editor, Worldtalk, "draft-ietf-smime-msg-04.txt: S/MIME Version 3 Message Specification," May 4, 1998, pp. 1-26.*

Ramsdell, B., Editor, Worldtalk: "S/MIME Version 3 Message Specification", Internet Draft, draft-ietf-smime-msg-04. txt, May 4, 1998; pp. 1-26.

Ramsdell, B., Editor, Worldtalk: "S/MIME Version 3 Message Specification" Internet Engineering Task Force, Network Working Group, Request for Comments: 2633, Jun. 1999, pp. 1-30. XP002262227.

Yamaguchi, Suguru: "Information Security, First Edition", Kyoritsu Shuppan Kabushikigaisha, Sep. 20, 2000, first edition, p. 177. No English translation available.

Moser, Heinrich: "S/MIME", Dec. 2001-Jan. 2002, pp. 1-13.

* cited by examiner

Opaque Signature

Clear Signature

TRANSMISSION OF SECURE ELECTRONIC MAIL FORMATS

FIELD OF THE INVENTION

This invention relates generally to computing systems and more particularly to computing systems for the creation and transmission of secure electronic mail.

BACKGROUND OF THE INVENTION

Electronic mail (e-mail) systems will, in many cases, include a feature to allow e-mail messages to be digitally signed. A digital signature is an encoded value that is included with an e-mail message to provide a recipient with information to confirm that the message is sent by a trusted sender and/or that the message is unchanged during the transmission process. Such an email system is considered a secure e-mail system. A well-known protocol for secure e-mail is the Secure Multi-Purpose Internet Mail Extension (S/MIME).

Two different types of digital signature schemes are in common use in secure e-mail: opaque and clear. An opaque signature is one where the secure e-mail has the message content contained inside the digital signature encoding. This approach, defines a signature for the message content and then encodes both that signature and the message content. The resulting encoded data is then transmitted as the e-mail message body.

A clear signature is one in which a digital signature is encoded and included with the e-mail message as an attachment. The message content is not altered and is sent in this unaltered state in the message body of the e-mail.

An advantage of an opaque e-mail message is that the content of the message is not available to recipients who are not provided with the appropriate information to decode the e-mail message body. In addition, since the message content is not immediately available, there is less of a potential for an email gateway to modify the message in some way and, in doing so, invalidate the digital signature. However, a disadvantage to the use of opaque signatures for secure e-mail is that many e-mail applications (for example Outlook 2000™ from Microsoft Corporation) are unable to display opaque signed messages in the message preview pane. To obtain the preview of the message, a user of such an e-mail application is required to open the email, thus defeating the advantages associated with the use of a preview view in the e-mail application. Further, where a receiving e-mail application does not support the protocol used to encode the e-mail, the content of an opaque signed e-mail message cannot be viewed at all.

It is therefore desirable to have a mechanism for permitting secure e-mails that are created as opaque signed to be transmitted to allow a receiving e-mail application to display such e-mails using a preview view or to allow the content of such e-mail messages to be accessible, despite a receiving e-mail application not supporting the opaque signed protocol of the sending e-mail application

SUMMARY OF THE INVENTION

According to an aspect of the invention there is provided a method and system for the transmission of e-mails to provide for conversion of secure e-mail to permit a receiving e-mail application to use a preview view for the e-mail or to access the message content without decoding the digital signature.

According to another aspect of the invention there is provided a computer implemented method for transmitting e-mail, the method including the following steps:

sending a secure first e-mail message addressed to a recipient and including an opaque signature to an e-mail server;

decoding the first e-mail message at the e-mail server to extract the content of the first e-mail message and to extract the digital signature of the first e-mail message;

generating a clear signed e-mail message at the e-mail server, the clear signed message including both the extracted content of, and the extracted digital signature of, the first e-mail message; and forwarding the clear signed e-mail message to the recipient.

According to another aspect of the invention there is provided the above method in which the first e-mail message conforms to the S/MIME standard.

According to another aspect of the invention there is provided the above method in which the step of extracting the content of and the digital signature of the first e-mail message includes the steps of:

identifying the object encapContentInfo for the opaque signed e-mail message;

copying and deleting the eContent value from encapContentInfo; and defining the extracted content and the extracted digital signature as the content and the digital signature in the clear signed e-mail message.

According to another aspect of the invention there is provided the above method further including the step of determining whether the first e-mail message meets a set of pre-defined criteria for conversion to clear signed format.

According to another aspect of the invention there is provided an apparatus for transmitting e-mail, including an e-mail server, the e-mail server including:

computer code executable to receive an opaque signed e-mail message;

computer code executable to decode the opaque signed e-mail message to extract the content of the opaque signed e-mail message and to extract the digital signature of the opaque signed e-mail message;

computer code for generating a clear signed e-mail message, the clear signed message including both the extracted content of, and the extracted digital signature of, the first e-mail message; and computer code for forwarding the clear signed e-mail message to the recipient.

According to another aspect of the invention there is provided the above apparatus in which the first secure e-mail message conforms to the S/MIME standard.

According to another aspect of the invention there is provided the above apparatus in which the computer code for extracting the content of and the digital signature of the opaque signed e-mail message includes the steps of:

identifying the object encapContentInfo for the opaque signed e-mail message;

copying and deleting the eContent value from encapContentInfo; and defining the extracted content and the extracted digital signature as the content and the digital signature in the clear signed e-mail message.

According to another aspect of the invention there is provided the above apparatus further including computer code for determining whether the opaque signed e-mail message meets a set of pre-defined criteria for conversion to clear signed format.

Advantages of the invention include the ability for a sending e-mail application to use opaque signatures for outbound e-mails and for a receiving e-mail application to be able to view the message content and/or generate a preview of such secure e-mails without needing to decode the associated digital signature.

BRIEF DESCRIPTION OF THE DRAWINGS

In drawings which illustrate by way of example only a preferred embodiment of the invention.

DETAILED DESCRIPTION OF THE INVENTION

Figure 1:
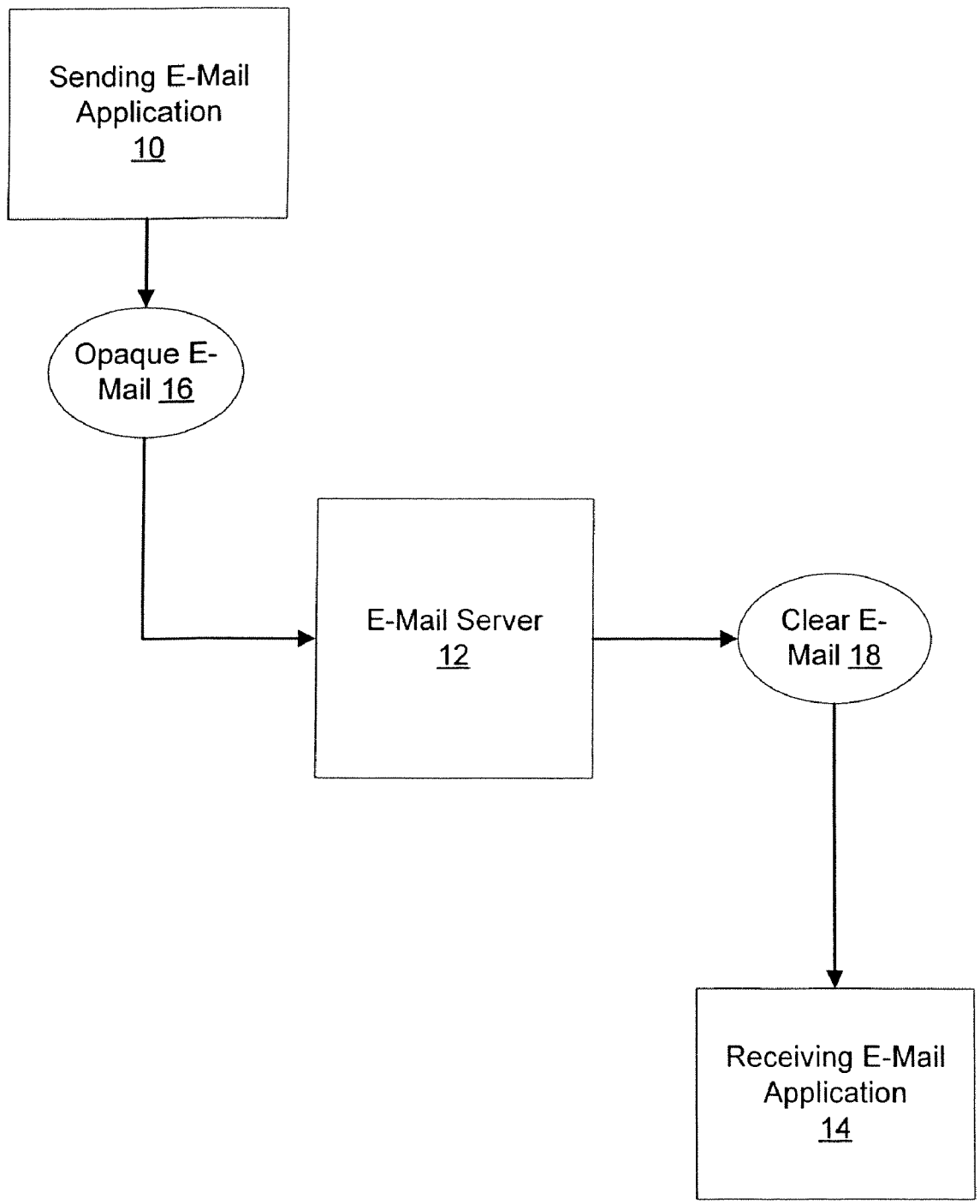
FIG. 1 is block diagram showing aspects of the transmission of e-mails in accordance with the preferred embodiment.

The preferred embodiment is described with reference to an e-mail system in which an e-mail application forwards e-mails to an e-mail server for transmission to a recipient or receiving e-mail application. The block diagram of FIG. 1 illustrates one such arrangement. Sending e-mail application 10 uses e-mail server 12 to handle outbound e-mails generated by e-mail application 10. In the example of FIG. 1, receiving e-mail application 14 is a recipient of e-mails from sending e-mail application 10.

The preferred embodiment is described with reference to sending and receiving e-mail applications. It will be understood by those skilled in the art that an e-mail application includes program code that is executable to provide a user with the ability to manipulate e-mail messages. Typically, an e-mail application will provide the user with functions for creating, sending, receiving, viewing, and storing e-mail messages. Subsets of these functions may also be provided in different e-mail applications intended to be used with particular devices. The program code of an e-mail application may be executable on a personal computer, a wireless handheld device, or other devices that are intended to permit e-mails to be created or read.

The example of FIG. 1 shows opaque e-mail 16 being forwarded from sending e-mail application 10 to e-mail server 12. As will be understood by those skilled in the art, e-mail application 10 may be one of many commercially available or custom-developed e-mail systems. E-mail application 10 does, however, have the capability of generating secure e-mail using an opaque signature. In the example of FIG. 1, opaque e-mail 16 is such an e-mail generated by e-mail application 10.

Figure 2:
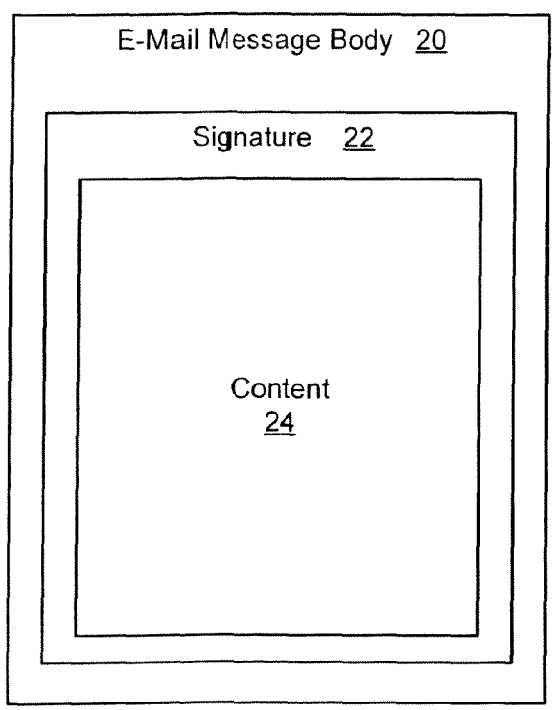
FIG. 2 is a block diagram illustrating the elements of opaque signed and clear signed e-mail messages (prior art).
Figure 2:
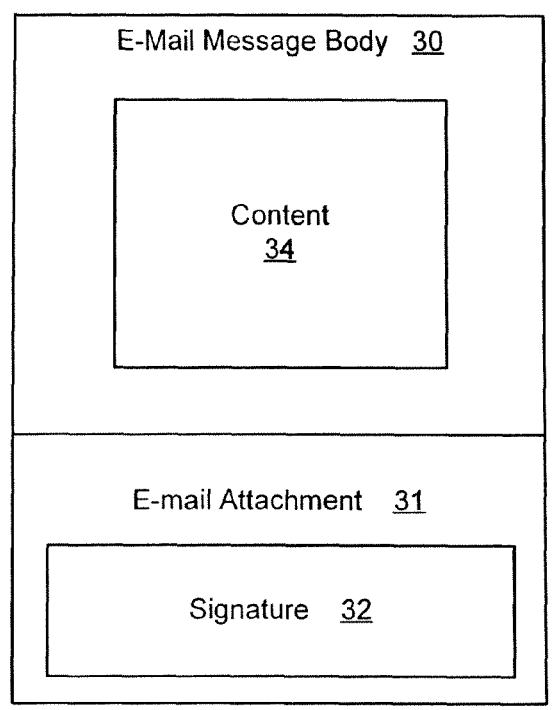

FIG. 2 is a block diagram that illustrates the high level elements of an e-mail message having an opaque signature and provides a similar illustration for an e-mail having a clear signature. In FIG. 2, a generalized example of an opaque signed e-mail is illustrated with e-mail message body 20 shown as containing signature 22 which, in turn, contains content 24 within its encoding. As referred to above, signature 22 is encoded. Also in FIG. 2, a generalized example of a clear signed e-mail is illustrated with e-mail message body 30 and e-mail attachment 31. E-mail message body 30 includes content 34 which is not encoded within the signature. In the case of this clear signed e-mail, signature 32 is encoded and is placed in e-mail attachment 31.

As will be appreciated by the elements of the e-mail formats shown in FIG. 2, when opaque e-mail 16 is sent from sending e-mail application 10, the content is found only in an encoded portion of the e-mail message body (shown as e-mail body 20 in FIG. 2). When received by a recipient having an e-mail application, the message body of an opaque signed secure e-mail is processed and signature 22 is decoded to allow content 24 to be extracted and displayed. If the receiving e-mail application is unable to decode signature 22 then the e-mail cannot be displayed to the user with that application. Thus, for example, if an S/MIME format is used for creating the e-mail and the receiving e-mail application does not support S/MIME, the content of the e-mail cannot be accessed.

Further, in typical e-mail applications, there is a preview pane that is optionally displayed when lists of e-mail messages are displayed for a user. In such applications, it is typical for the preview pane to merely present the e-mail message content (or a portion of the content) without decoding such content. Thus, when an e-mail is sent in an opaque signed format, the message is not viewable in the preview pane of such a receiving e-mail application.

According to the preferred embodiment, e-mail is transmitted through an e-mail server. The e-mail server includes program code for converting opaque signed e-mail to a clear signed format. This can be seen in the example of FIG. 1. Sending e-mail application 10 generates example e-mail 16, in opaque signed S/MIME format. In the preferred embodiment this e-mail is forwarded to e-mail server 12, prior to the e-mail being sent to receiving e-mail application 14. According to the preferred embodiment, the functionality of e-mail server 12 includes a conversion function to convert opaque signed messages to clear signed messages. As will be appreciated, e-mail server 12 is able to decrypt the opaque signed messages sent by sending e-mail application 10. In the preferred embodiment the encoding of e-mail 16 is an S/MIME encoding and the steps carried out to convert e-mail message 16 into a clear signed format (e-mail 18) are set out in the flow diagram of FIG. 3. In general, the step of conversion includes extraction of the message content and of the digital signature from the opaque signed e-mail, the extracted message content and the extracted digital signature then being included in a clear signed e-mail message that e-mail server 12 sends to the recipient.

Figure 3:
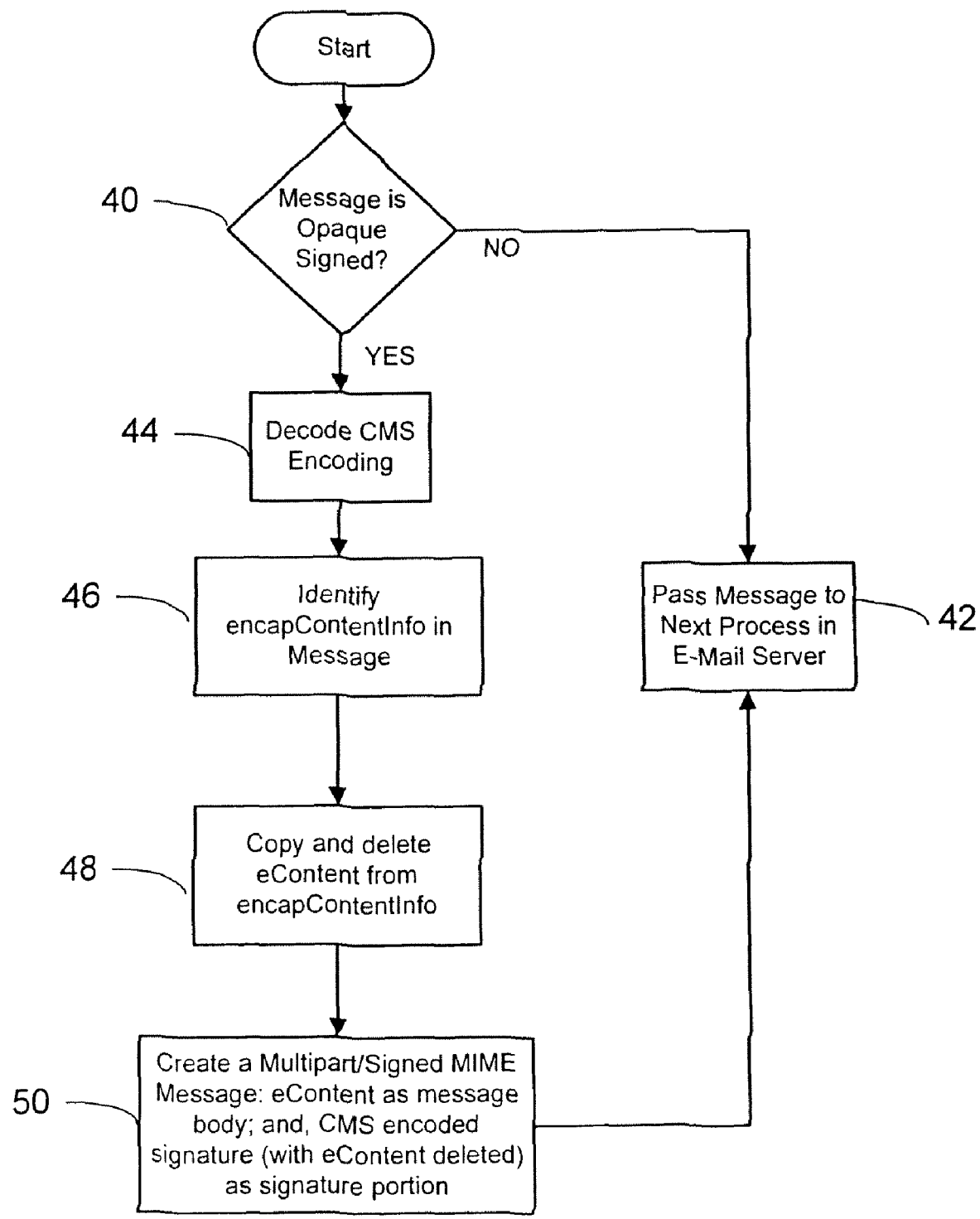
FIG. 3 is a flow diagram illustrating the conversion of opaque signed e-mails in accordance with the preferred embodiment.

As shown in decision box 40 in FIG. 3, the first step carried out in the conversion process at the e-mail server is to determine whether the e-mail message is opaque signed or not. In the case of an S/MIME message, this process is carried out by viewing the MIME content type of the message. If it is of type multipart signed, then it is clear signed. Otherwise, a check on the Cryptographic Message Syntax (CMS) encoding of the message is carried out to determine if it is signed. Then is done by looking at the value of the contentInfo Object Identifier at the start of the encoding and seeing if it indicates that the message is signed. If it is signed then it must be opaque signed, otherwise it may be encrypted, compressed or some other encoding mechanism used. If the message is not opaque signed, then as shown in step 42 of FIG. 3, the message is passed to the next part of the process otherwise carried out by e-mail server 12 in transmitting the e-mail message to the recipient.

Alternatively, if the e-mail server determines that the e-mail message is opaque signed, step 44 of the conversion is to process the Cryptographic Message Syntax (CMS) encoding of the S/MIME message to decode the e-mail message. As indicated above, e-mail server 12 has the appropriate information available to permit the decoding of e-mail messages from e-mail application 10 that are encoded using the S/MIME format of the preferred embodiment.

Once the e-mail message has been decoded, step 46 is carried out. The conversion process identifies the encapContentInfo part of the S/MIME e-mail message (the part of the e-mail message object that in the S/MIME standard includes the message content and the digital signature). The next step in the conversion (step 48 in FIG. 3) is to read the eContent part of the identified encapContentInfo. This is the message content and will form the clear message in a resulting converted clear signed e-mail message. As part of step 48, the eContent part is removed from the CMS encoding of the message (with the consequential update of the appropriate length information for the message). The resulting CMS encoding (minus the eContent) will form the signature for the converted clear signed e-mail message.

The last step in the conversion is to create a MIME message of type multipart/signed (the new clear signed e-mail message). The information to be used to define the new message has been defined as described with reference to the above steps. Step 50 of FIG. 3 involves the creation of the message object that includes:

a. the contents of the eContent part of the opaque signed e-mail message becomes the message part of the clear signed e-mail message (see content 34 in the FIG. 2); and b. the CMS encoding of the signature (with the eContent removed) as the other parts of the multipart/signed message (including signature 32 as shown in FIG. 2).

The result of the above conversion process is clear e-mail 18 as shown in the example of FIG. 1. This e-mail is forwarded to receiving e-mail application 14 (as shown in FIG. 1). Receiving e-mail application 14 recognizes the inbound e-mail as a clear signed format. Due to the presence of content in a non-encrypted (non-encoded) format, the preview pane for receiving e-mail application 14 is able to be used to display some or all of the content of clear e-mail 18. Similarly, receiving e-mail application need not support S/MIME format for the message content to be readable. In the latter case, it will be understood that the functions carried out by the digital signature are not available (as the signature is not readable by an application that does not support the encrypting process used for the original generation of the signature). However, as will be appreciated, the ability to read the message content, despite the absence of a useable digital signature, is a potentially advantageous feature of the system described.

The preferred embodiment is described with reference to e-mail that is sent via an e-mail server. Such a server may be used in systems where wireless handheld devices are used to create e-mail messages that are then transmitted to an enterprise e-mail server for forwarding through an Internet e-mail connection to recipients. Other implementations of the preferred embodiment may involve the transmission and conversion of e-mail through other systems that operate in a manner analogous to e-mail servers. In general, e-mail generated with an opaque signed format is forwarded to a computer system that includes a conversion function that permits the e-mail to be converted to a clear signed format before being sent to the receiving e-mail application. It will be appreciated that the conversion of the secure e-mail messages involves the decoding or decrypting of information and that therefore the e-mail servers in question are preferably secure to prevent the e-mail conversion process from being a point of insecurity for the e-mail system.

The e-mail server is typically implemented by way of an e-mail server application comprising program code that executes on a server computer. The e-mail server application may be delivered as a computer program product in a computer code storage medium such as a magnetic, optical or electronic storage device. Such an e-mail server application is typically installed on a server computer in executable form. The e-mail server in operation is an apparatus that is capable of carrying out the operations described.

In the preferred embodiment, the e-mail server includes program code that executes to carry out the conversion of the e-mail. The e-mail server also carries out other logging and administrative functions for e-mail applications. It will be appreciated that although the e-mail server that converts e-mails as described will often be associated with the sending e-mail application, it is also possible for such a conversion e-mail server to be associated with the receiving e-mail application. In such a case the e-mail server may be an enterprise server that receives e-mail and then redirects the e-mail to the appropriate recipient device. Such an arrangement is possible where the receiving e-mail application executes on a wireless handheld device and e-mails are routed through an enterprise server that sends e-mail to a desktop destination and to the wireless handheld device. In such an arrangement, the e-mail server associated with the receiving e-mail application may receive opaque signed e-mail messages. The e-mail server, if the appropriate information regarding the encoding of the opaque signed e-mail message is available to it, may operate to convert the e-mail message to a clear signed format.

In the preferred embodiment, the conversion function may be optionally invoked. In some contexts an opaque signed e-mail message may be desired even where a receiving e-mail application may not be able to access the e-mail content as a result. For this reason, an administrator for the e-mail server is able to selectively determine whether the conversion function will apply to e-mails handled by the e-mail server. A further extension involves the administrator applying a more sophisticated filter to the incoming e-mails to allow the e-mail server to convert opaque signed e-mails that meet a set of defined criteria (for example, sender name, recipient name, sender user group, and so forth).

Various embodiments of the present invention having been thus described in detail by way of example, it will be apparent to those skilled in the art that variations and modifications may be made without departing from the invention. The invention includes all such variations and modifications as fall within the scope of the appended claims.

The invention claimed is:

1. A system for handling received e-mail messages addressed to a recipient, the system comprising a server, the server comprising a processor configured to:

copy the message content comprised in an opaque signature of a received e-mail message, the opaque signature comprising both the message content and a digital signature for the received e-mail message;

delete the message content thus copied from the opaque signature, such that a remaining portion of the opaque signature comprises the digital signature for the received e-mail message; and generate a clear signed e-mail message comprising the message content thus copied and the digital signature for the received e-mail message.

2. The system of claim 1 wherein the remaining portion of the opaque signature comprises the entire remainder of the opaque signature after the message content is deleted.

3. The system of claim 1, wherein the processor is further configured to update a length information value associated with the received e-mail message after deleting the message content from the opaque signature.

4. The system of claim 1, wherein the received e-mail message conforms to an S/MIME standard and the opaque signature is a Cryptographic Message Syntax encoding of the received e-mail message.

5. The system of claim 4, wherein the Cryptographic Message Syntax encoding comprises an object encapContentInfo, the processor being further configured to:

copy the message content from the opaque signature by copying the message content from the object encapContentInfo; and delete the message content thus copied from the opaque signature by deleting the message content from the object encapContentInfo, such that the digital signature comprises a remainder of the Cryptographic Message Syntax encoding after the message content is deleted.

6. The system of claim 1, wherein the processor is further configured to enable transmission of the clear signed e-mail message to a recipient of the received e-mail message.

7. The system of claim 1, wherein the processor is further configured to enable redirection of the clear signed e-mail message to a recipient of the received e-mail message.

8. The system of claim 7, further comprising a wireless handheld device associated with the recipient, the device being configured to display at least a portion of the message content from the clear signed e-mail message.

9. A computer program product comprising a physical medium having program code executable by a server computer, the program code comprising code executable to:
copy the message content comprised in an opaque signature of a received e-mail message;
delete the message content thus copied from the opaque signature, such that a remaining portion of the opaque signature comprises a digital signature for the received e-mail message; and
generate a clear signed e-mail message comprising the message content thus copied and the digital signature for the received e-mail message.

10. The computer program product of claim 9 wherein the remaining portion of the opaque signature comprises the entire remainder of the opaque signature after the message content is deleted.

11. The computer program product of claim 9, wherein the program code further comprises code executable to update a length information value associated with the received e-mail message after deleting the message content from the opaque signature.

12. The computer program product of claim 9, wherein the received e-mail message conforms to an S/MIME standard and the opaque signature is a Cryptographic Message Syntax encoding of the received e-mail message.

13. The computer program product of claim 12 wherein the Cryptographic Message Syntax encoding comprises an object encapContentInfo, the computer program product further comprising code executable to:
copy the message content from the opaque signature by copying the message content from the object encapContentInfo; and
delete the message content thus copied from the opaque signature by deleting the message content from the object encapContentInfo,
such that the digital signature comprises a remainder of the Cryptographic Message Syntax encoding after the message content is deleted.

14. The computer program product of claim 9, further comprising code executable to enable transmission of the clear signed e-mail message to a recipient of the received e-mail message.

15. The computer program product of claim 9, further comprising code executable to enable redirection of the clear signed e-mail message to a recipient of the received e-mail message.

16. A method for converting an e-mail message received at a server computer and comprising an opaque signature, the opaque signature comprising both message content and a digital signature for the received e-mail message, the method comprising:
copying, at the server computer, the message content from the opaque signature of the received e-mail message;
deleting, at the server computer, the message content thus copied from the opaque signature, such that a remaining portion of the opaque signature comprises the digital signature; and
generating, at the server computer, a clear signed e-mail message for transmission from the server computer, the clear signed e-mail message comprising the message content thus copied and the digital signature for the received e-mail message.

17. The method of claim 16, wherein the remaining portion of the opaque signature comprises the entire remainder of the opaque signature after the message content is deleted.

18. The method of claim 16, wherein generating the clear signed e-mail message further comprises updating a length information value associated with the received e-mail message.

19. The method of claim 16, wherein the received e-mail message conforms to an S/MIME standard; and
wherein the opaque signature is a Cryptographic Message Syntax encoding of the received e-mail message.

20. The method of claim 19,
wherein the Cryptographic Message Syntax encoding comprises an object encapContentInfo, such that said copying the message content from the opaque signature comprises copying the message content from the object encapContentInfo;
wherein said deleting the message content thus copied from the opaque signature comprises deleting the message content from the object encapContentInfo; and
wherein the digital signature comprises a remainder of the Cryptographic Message Syntax encoding after the message content is deleted.

21. The method of claim 20, wherein the clear signed e-mail message conforms to a MIME standard.

22. The method of claim 16,
wherein said copying the message content, said deleting the message content, and said generating the clear signed e-mail message are carried out at an e-mail server associated with a sender of the received e-mail message; and
wherein the method further comprises transmitting, to a recipient of the received e-mail message, the clear signed e-mail message.

23. The method of claim 16,
wherein the server computer is associated with and transmits e-mail to a recipient of the received e-mail message; and
wherein the method further comprises redirecting the clear signed e-mail message to the recipient.

24. The method of claim 23, further comprising:
receiving the clear signed e-mail message at a device associated with the recipient; and
displaying at least a portion of the message content comprised in the clear signed e-mail message at the device.

25. The method of claim 23, wherein redirecting the clear signed e-mail message to the recipient comprises redirecting the clear signed e-mail message to a device associated with the recipient.

* * * * *